US012105935B2

(12) United States Patent
Luo

(10) Patent No.: US 12,105,935 B2
(45) Date of Patent: Oct. 1, 2024

(54) METHOD FOR DISPLAYING BACKGROUND APPLICATION AND MOBILE TERMINAL

(71) Applicant: VIVO MOBILE COMMUNICATION CO., LTD., Guangdong (CN)

(72) Inventor: Liang Luo, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 373 days.

(21) Appl. No.: 17/146,530

(22) Filed: Jan. 12, 2021

(65) Prior Publication Data

US 2022/0365641 A1 Nov. 17, 2022
US 2023/0069818 A9 Mar. 2, 2023

Related U.S. Application Data

(63) Continuation of application No. PCT/CN2019/094489, filed on Jul. 3, 2019.

(30) Foreign Application Priority Data

Jul. 13, 2018 (CN) .......................... 201810770333.0

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
CPC .......... G06F 3/048; G06F 3/00; G06F 3/0484; G06F 3/0442; G06F 3/0487; G06F 3/04842; G06F 2203/04803
See application file for complete search history.

(56) References Cited

U.S. PATENT DOCUMENTS

| 9,141,272 | B1* | 9/2015 | Cleron | ................. G06F 3/0482 |
| 2007/0220440 | A1 | 9/2007 | Song et al. | |
| 2011/0138332 | A1 | 6/2011 | Miyagawa | |
| 2011/0252381 | A1* | 10/2011 | Chaudhri | .............. G06F 3/0485 |
| | | | | 715/838 |
| 2013/0312083 | A1* | 11/2013 | Farraro | ............... G06F 3/04845 |
| | | | | 726/16 |

(Continued)

FOREIGN PATENT DOCUMENTS

| CN | 102364438 A | 2/2012 |
| CN | 104199646 A | 12/2014 |

(Continued)

OTHER PUBLICATIONS

D. Frakes, "Hands on with iOS 4 folders," published Jun. 21, 2010, downloaded from https://www.macworld.com/article/206116/ios4folders.html (Year: 2010).*

(Continued)

*Primary Examiner* — Eric J Yoon
(74) *Attorney, Agent, or Firm* — Brooks Kushman P.C.

(57) ABSTRACT

A method for displaying a background application and a mobile terminal are provided. The method includes: displaying a background application screen; and if a first input with respect to an application icon or an application screen thumbnail in the background application screen is received, displaying a background application classification screen.

12 Claims, 8 Drawing Sheets

(56) References Cited

U.S. PATENT DOCUMENTS

| | | | |
|---|---|---|---|
| 2014/0059492 A1* | 2/2014 | Hashida | G06F 3/04817 |
| | | | 715/835 |
| 2014/0136213 A1* | 5/2014 | Kim | G06F 16/489 |
| | | | 704/275 |
| 2014/0324873 A1 | 10/2014 | Lee | |
| 2016/0062793 A1* | 3/2016 | Chu | G06F 9/485 |
| | | | 718/100 |
| 2016/0092086 A1 | 3/2016 | Lin | |
| 2018/0253219 A1* | 9/2018 | Dotan-Cohen | G06F 16/907 |
| 2018/0307388 A1* | 10/2018 | Chaudhri | H04M 1/72469 |
| 2019/0243518 A1 | 8/2019 | Li | |
| 2020/0233551 A1* | 7/2020 | Qian | G06F 3/0481 |

FOREIGN PATENT DOCUMENTS

| | | |
|---|---|---|
| CN | 105960003 A | 9/2016 |
| CN | 106406996 A | 2/2017 |
| CN | 106598389 A | 4/2017 |
| CN | 107015721 A | 8/2017 |
| CN | 107291543 A | 10/2017 |
| CN | 107765941 A | 3/2018 |
| CN | 107765959 A | 3/2018 |
| CN | 107766100 A | 3/2018 |
| CN | 109032734 A | 12/2018 |
| JP | 2007249944 A | 9/2007 |
| JP | 2011118673 A | 6/2011 |
| KR | 20110037654 A | 4/2011 |
| KR | 20140125675 A | 10/2014 |
| KR | 20170048441 A | 5/2017 |

OTHER PUBLICATIONS

YouTube video by username Micro Center, "How to close background applications on an iPad," published Jun. 7, 2013, downloaded from https://www.youtube.com/watch?v=JQZr0ormgkM (Year: 2013).*

ISR and Written Opinion received for PCT Application No. PCT/CN2019/094489, mailed on Jan. 28, 2021, 9 pages and 7 pages of English Translation.

Office Action Received for CN Patent Application No. 201810770333.0 mailed on Dec. 11, 2019, 12 pages and 9 pages of English Translation.

Second Office Action for Japanese Application No. 2021-524089, dated Sep. 1, 2022, 3 Pages.

First Office Action for Japanese Application No. 2021-524089, dated Jan. 19, 2022, 4 Pages and 4 pages of English Translation.

First Office Action for Korean Application No. 10-2021-7003594, dated Apr. 28, 2022, 4 Pages.

"The Lingo Star, Neighbor Blog: UI Detail Term," https://blognaver.com/naruto0314/220150490575, dated Oct. 14, 2014, 7 pages.

* cited by examiner

METHOD FOR DISPLAYING BACKGROUND APPLICATION AND MOBILE TERMINAL

CROSS-REFERENCE TO RELATED APPLICATIONS

This application is continuation application of PCT International Application No. PCT/CN2019/094489 filed on Jul. 3, 2019, which claims priority to Chinese Patent Application No. 201810770333.0 filed in China on Jul. 13, 2018, the disclosures of which are incorporated in their entireties by reference herein.

TECHNICAL FIELD

This disclosure relates to the field of communications technologies, and in particular, to a method for displaying a background application and a mobile terminal.

BACKGROUND

With rapid development of mobile terminals, mobile terminals have become an indispensable tool in people's lives, and have brought great convenience to all aspects of users' lives. Mobile terminals generally support multiple applications running in the background. In actual use, when a mobile terminal displays multiple background applications, each background application needs to be displayed separately. This means that a current background application display manner may cause inconvenience of operation.

SUMMARY

Embodiments of this disclosure provide a method for displaying a background application and a mobile terminal to solve the problem of operation inconvenience caused by a background application display manner.

To resolve the foregoing technical problem, this disclosure is implemented as follows.

In a first aspect, the embodiments of this disclosure provide a method for displaying a background application, where the method includes:
  displaying a background application screen, where the background application screen includes an application icon or an application screen thumbnail of at least one background application; and
  if a first input with respect to the application icon or the application screen thumbnail in the background application screen is received, displaying a background application classification screen, where the background application classification screen includes identification information of at least one background application set, and application icons or application screen thumbnails of background applications in a first background application set.

According to a second aspect, the embodiments of this disclosure further provide a mobile terminal, including:
  a first displaying module, configured to display a background application screen, where the background application screen includes an application icon or an application screen thumbnail of at least one background application; and
  a second displaying module, configured to: if a first input with respect to the application icon or the application screen thumbnail in the background application screen is received, display a background application classification screen, where the background application classification screen includes identification information of at least one background application set, and application icons or application screen thumbnails of background applications in a first background application set.

According to a third aspect, the embodiments of this disclosure further provide a mobile terminal, including: a memory, a processor, and a computer program that is stored in the memory and is capable of running on the processor, where when the computer program is executed by the processor, steps of the foregoing method for displaying a background application are implemented.

According to a fourth aspect, the embodiments of this disclosure further provide a computer-readable storage medium, where the computer-readable storage medium stores a computer program, and when the computer program is executed by a processor, steps of the foregoing method for displaying a background application are implemented.

In the embodiments of this disclosure, the background application screen is displayed, and if the first input with respect to the application icon or the application screen thumbnail in the background application screen is received, the background application classification screen is displayed. The background application classification screen includes the identification information of the at least one background application set, and the application icons or the application screen thumbnails of the background applications in the first background application set. In this way, information on multiple background applications may be displayed in the background application classification screen, making an operation on the background applications more convenient.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
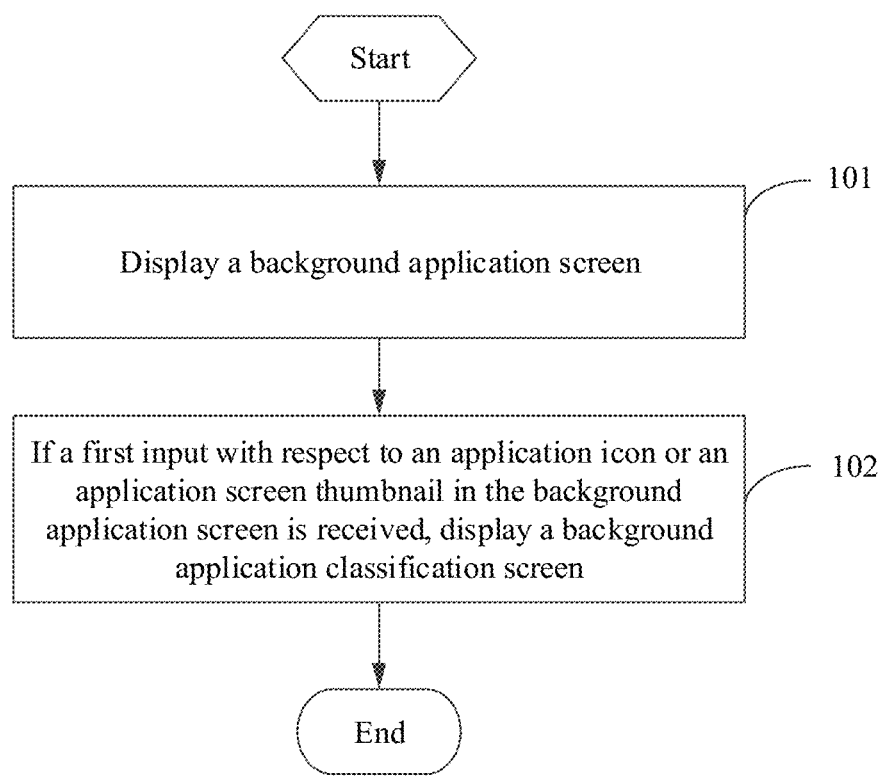
FIG. 1 is a flowchart of a method for displaying a background application according to an embodiment of this disclosure.

FIG. 1 is a flowchart of a method for displaying a background application according to an embodiment of this disclosure. As shown in FIG. 1, the method includes the following steps.

Step 101. Display a background application screen, where the background application screen includes an application icon or an application screen thumbnail of at least one background application.

The background application screen includes the application icon or the application screen thumbnail of the at least one background application. For example, the background application may be at least one of a communication application, a payment application, a game application, and the like. Of course, a specific type is not limited herein.

In addition, the at least one background application may all be displayed as application icons, or all be displayed as screen thumbnails, or some may be displayed as application icons and some may be displayed as screen thumbnails. A specific display form is not limited herein.

Step 102. If a first input with respect to the application icon or the application screen thumbnail in the background application screen is received, display a background application classification screen, where the background application classification screen includes identification information of at least one background application set, and application icons or application screen thumbnails of background applications in a first background application set.

In this step, the background application classification screen includes multiple information entries about the background application. This first improves the effect in displaying the background application on a mobile terminal, and second, makes it more convenient for a user to operate the background application. For example, the user may search for a background application more efficiently, or close background applications included in a background application set at a time, thereby improving efficiency in operating the background applications.

If the mobile terminal receives the first input, the at least one background application included in the background application screen may be classified to obtain the at least one background application set, and the background application classification screen including information on the at least one background application set may be displayed. For example, the first input is a pinch operation or a pressing operation for a background application.

Of course, the mobile terminal may alternatively complete classification of the at least one background application included in the background application screen while this background application screen is displayed. For example, when the mobile terminal displays the background application screen, the background application may be classified when a preset condition being met is automatically detected. For example, the mobile terminal may detect a quantity of background applications, and if the quantity exceeds a preset value, the background application may be classified. The preset value may be 5, 7, or 10, and is not specifically limited herein. In addition, the mobile terminal may also detect whether a tilt angle of the mobile terminal exceeds a preset angle value, and if the preset angle value is exceeded, the background applications may be classified. The preset angle value may be 3 degrees, 5 degrees, or 7 degrees, or the like, and is not specifically limited herein.

The first background application set may be any background application set. For example, if the background application classification screen includes a background application set that includes application icons or application screen thumbnails of social software, and a background application set that includes application icons or application screen thumbnails of payment software, when the background application classification screen displays the application icons or the application screen thumbnails of the social software, the first background application set is the background application set that includes the application icons or the application screen thumbnails of the social software. Similarly, when the background application classification screen displays the application icons or the application screen thumbnails of the payment software, the first background application set is the background application set that includes the application icons or the application screen thumbnails of the payment software.

The identification information of the at least one background application set included in the classification screen may specifically be at least one of a keyword of the background application set, a numbering of the background application set, or an identification symbol of the background application set, or the like. For example, the keyword may be social, life, finance or the like, the numbering may be a first category, a second category, a third category, or the like, and the identification symbol may be a rectangle, a triangle, a diamond, or the like.

In addition, while displaying the identification information of the at least one background application set, the background application classification screen also includes the application icons or the application screen thumbnails of the background applications in the first background application set. Of course, the application icons or the application screen thumbnails may also display other information, such as a lock button, a delete button, an application name, an application numbering, or application background running duration.

It should be noted that if there are a large number of application icons or application screen thumbnails in the first background application set, only a part of the application icons or the application screen thumbnails may be displayed, and when a sliding input is received from the user, a part of the application icons or the application screen thumbnails that were not displayed before may be displayed on the background application classification screen.

In this embodiment, through steps 101 and 102, the background application classification screen may include the identification information of the at least one background application set, and the application icons or the application screen thumbnails of the background applications in the first background application set. In this way, information on multiple background applications is included in one background application classification screen. The above method for displaying a background application also makes an operation on the background applications more convenient. For example, the user may quickly search for a background application in the background application classification screen, or close all background applications included in a background application set simply by one operation, thereby improving efficiency in closing the background applications.

In addition, the foregoing mobile terminal may be a mobile phone, a tablet personal computer, a laptop computer, a personal digital assistant (PDA), a mobile internet device (MID), or a wearable device, or the like.

In this embodiment of this disclosure, the background application screen is displayed, and if the first input with respect to the application icon or the application screen thumbnail in the background application screen is received, the background application classification screen is displayed. The background application classification screen includes the identification information of the at least one background application set, and the application icons or the application screen thumbnails of the background applications in the first background application set. In this way, information on multiple background applications may be displayed in the background application classification screen, making an operation on the background applications more convenient.

Figure 2:
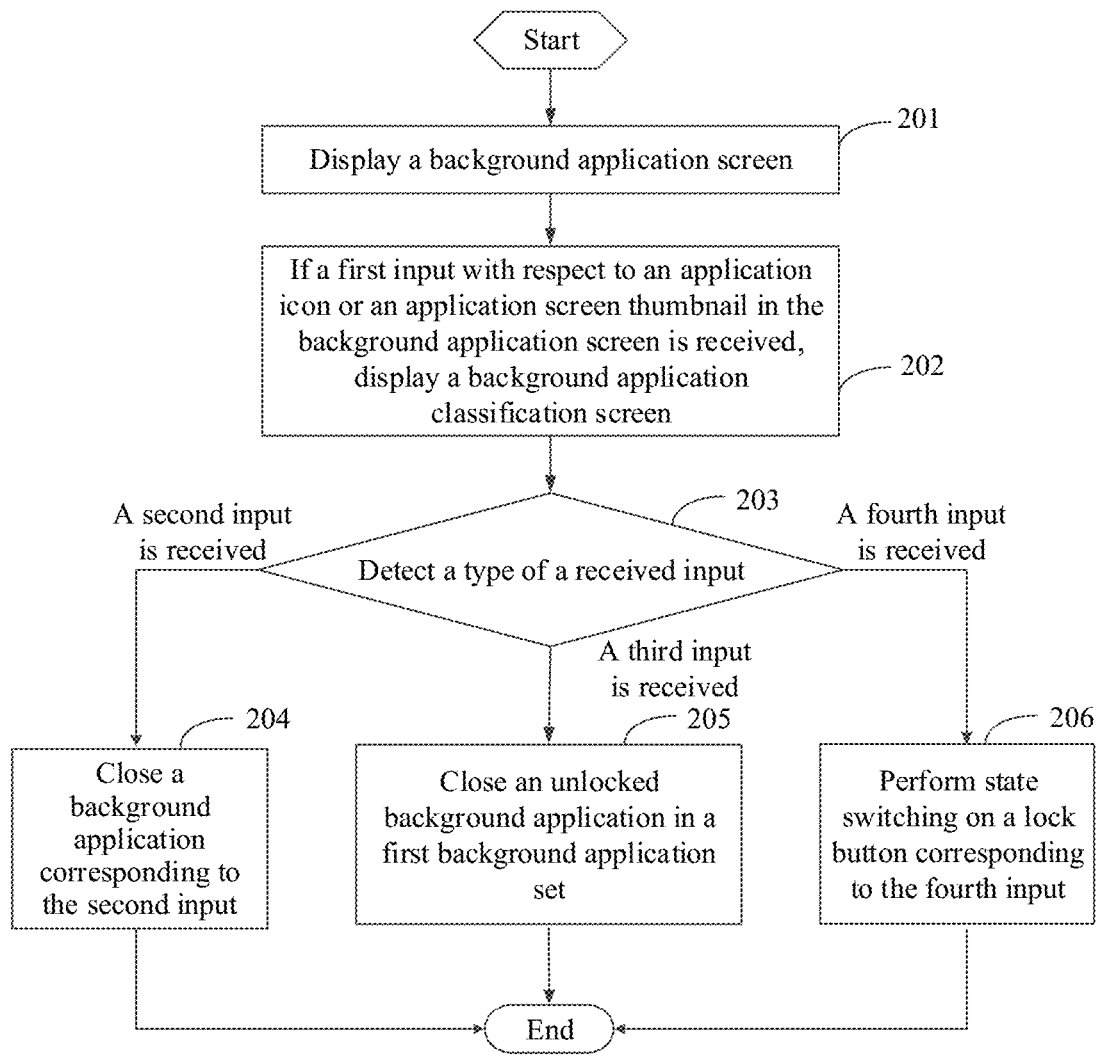
FIG. 2 is a flowchart of another method for displaying a background application according to an embodiment of this disclosure.

FIG. 2 is a flowchart of another method for displaying a background application according to an embodiment of this disclosure. A main difference between this embodiment and the foregoing embodiment is that: at least one of a main close button, a lock button, or a close button is also displayed in the background application classification screen, and the mobile terminal may perform a corresponding operation on the first background application set based on a received input with respect to the main close button, the lock button, or the close button. As shown in FIG. 2, the method includes the following steps.

Step 201. Display a background application screen, where the background application screen includes an application icon or an application screen thumbnail of at least one background application.

The background application screen includes the application icon or the application screen thumbnail of the at least one background application. For example, the background application may be at least one of a communication application, a payment application, or a game application, or the like. Of course, a specific type is not limited herein.

In addition, the at least one background application may all be displayed as application icons, or all be displayed as screen thumbnails, or some may be displayed as application icons and some may be displayed as screen thumbnails. A specific display form is not limited herein.

Step 202. If a first input with respect to the application icon or the application screen thumbnail in the background application screen is received, display a background application classification screen, where the background application classification screen includes identification information of at least one background application set, and application icons or application screen thumbnails of background applications in a first background application set.

For step 202, reference may be made to the description in step 102 in the foregoing embodiment, and therefore details are not described herein again, and the same beneficial technical effect as in step 102 may be achieved.

Optionally, the at least one background application set includes:
  at least one background application set obtained by classifying a first background application based on a user-defined label, where the first background application has the user-defined label; and/or at least one background application set obtained by classifying a second background application based on an application label, where the second background application has the application label, but does not have the user-defined label.

Every background application has an application label, but not necessarily a user-defined label. For a background application that is used frequently or closely related to life of the user, the user may set a user-defined label for this background application. For example, for a communication application, the user-defined label may be set as "communication", and for a payment application, the user-defined label may be set as "finance". It should be noted that the user-defined label may be set when an application is downloaded by the mobile terminal from an application store to the mobile terminal locally, or may be set during use of the mobile terminal. This is not specifically limited herein.

Specifically, for example, if the first background application set includes multiple background applications that have social functions, the first background application set may be obtained by classification based on a user-defined label of "social" that all the background applications have, or may be obtained by classification based on an application label of "social" that all the background applications have.

In this embodiment, one background application set includes background applications with a same user-defined label or a same application label, thereby facilitating an operation on background applications, for example, searching for a background application, or closing the background applications with a same user-defined label or a same application label.

It should be noted that all of steps 203, 204, 205, and 206 are optional.

Step 203. Detect a type of an input received, where a main close button is displayed in the background application classification screen, and at least one of a lock button or a close button is displayed on each application icon or each application screen thumbnail in the background application classification screen; and if a second input with respect to the close button is received, perform step 204, if a third input with respect to the main close button is received, perform step 205, or if a fourth input with respect to the lock button is received, perform step 206.

Figure 3:
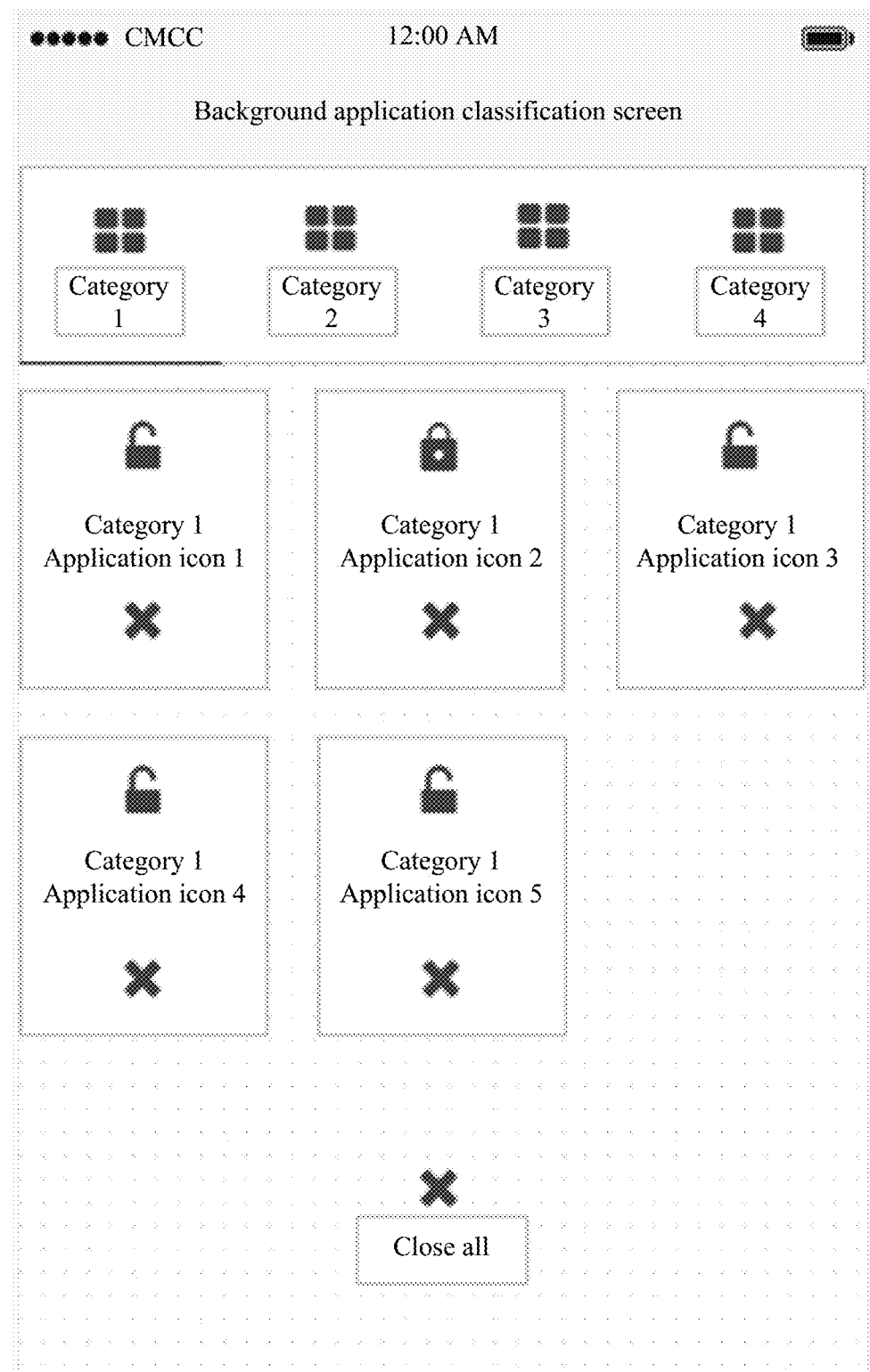
FIG. 3 is a first example diagram of another method for displaying a background application according to an embodiment of this disclosure.
Figure 4:
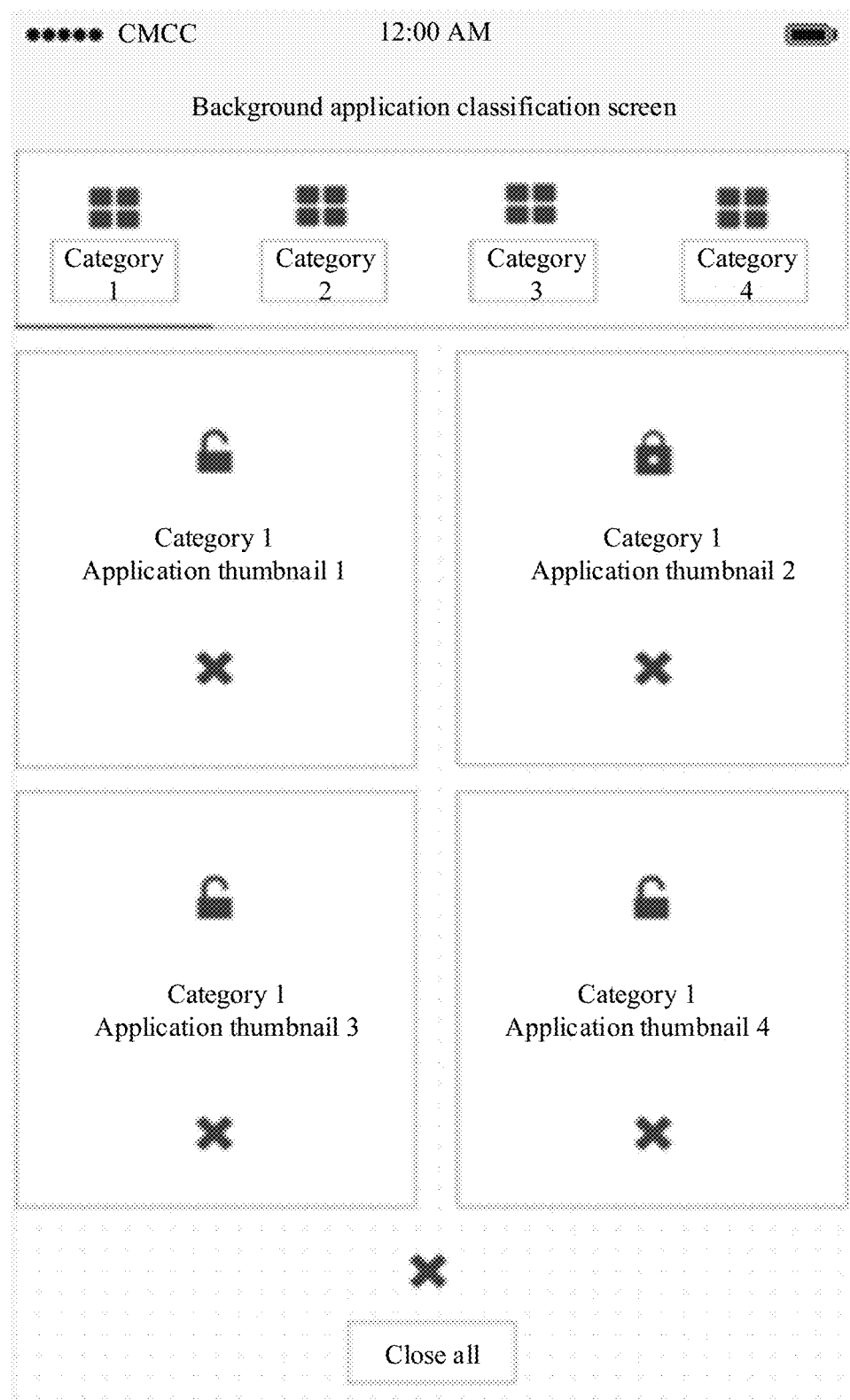
FIG. 4 is a second example diagram of another method for displaying a background application according to an embodiment of this disclosure.

For a display form of the background application classification screen, refer to FIG. 3 and FIG. 4. For example, in FIG. 3, an identification information box is displayed in the background application classification screen, where the identification information box includes identification information of at least one background application set, such as a category 1, a category 2, a category 3, and a category 4, and corresponding identification symbols. Of course, an application icon 1, an application icon 2, an application icon 3, an application icon 4 and an application icon 5 in the category 1 are also displayed in the background application classification screen. In addition, the main close button is also displayed in the background application classification screen. It should be noted that each application icon is also displayed with a lock button and a close button, and it may be seen from FIG. 3 that, except for the application icon 2 in a locked state, all other application icons are in an unlocked state.

In addition, a difference between FIG. 4 and FIG. 3 is that background applications in a category 1 in FIG. 4 are displayed as application thumbnails, and FIG. 4 only shows background application thumbnails of 4 background applications. It may be seen that in an application icon display mode, more background applications can be displayed in the background application classification screen, and in an application thumbnail display mode, background applications may be displayed with more complete information in the background application classification screen.

Step 204. Close a background application corresponding to the second input.

The second input with respect to the close button may be a touch operation for the close button, or a voice command used to trigger the close button to be enabled. The specific form is not limited herein.

In addition, if an operation that the user presses a target background application with a body part and slides along a target direction is received, the target background application may also be closed. The target direction may be a direction that points to identification information corresponding to the target background application from an application icon or an application screen thumbnail of the target background application.

In this step, closing a background application corresponding to the second input may increase processing speed of a processor, thereby improving use experience of the mobile terminal.

Step 205. Close an unlocked background application in the first background application set, where the unlocked background application is a background application whose lock button displayed on an application icon or an application screen thumbnail is in an unlocked state.

The third input with respect to the main close button may be a touch operation for the main close button, or a voice command used to trigger the main close button to be enabled.

In this step, part of the background applications in the first background application set may be set to a locked state, then the third input with respect to the main close button may be received, and the unlocked background application in the first background application set may be closed. In this way, multiple background applications that need to be closed may be closed at a time, while keeping a background application that does not need to be closed, thereby improving efficiency in closing the background applications.

Step 206. Perform state switching on the lock button corresponding to the fourth input, where the state switching includes switching from locked to unlocked, or includes switching from unlocked to locked.

If a background application is in the locked state, a lock button corresponding to the background application is also in the locked state. If the fourth input with respect to the lock button is received, the lock button is switched from the locked state to the unlocked state, and the background application corresponding to the lock button is also switched from the locked state to the unlocked state. In addition, switching from unlocked to locked is similar to the above step, and details are not described herein again.

In addition, the fourth input may be a touch input with respect to the lock button, or a voice command used to trigger the lock button to be enabled or disabled.

In this step, by performing state switching on the lock button, state switching may also be performed on the background application corresponding to the lock button. When the background application is in the locked state, if the third input with respect to the main close button is received, the background application is not closed. When the background application is in the unlocked state, if the third input with respect to the main close button is received, the background application is closed. In this way, the background application may be closed in a more flexible manner.

Optionally, after the step of displaying a background application classification screen, the method further includes:
  if all background applications in the first background application set are closed, deleting the first background application set from the background application classification screen, and displaying application icons or application screen thumbnails of background applications in a second background application set.
If the identification information of the first background application set is "finance", and all applications in this background application set are closed, this background application set is deleted, and the application icons or the application screen thumbnails of the background applications in the second background application set are displayed in the background application classification screen. Identification information of the second background application set may be "chat software" or "life".

In this embodiment of this disclosure, if all the background applications in the first background application set are closed, the first background application set is deleted from the background application classification screen. In this way, processing speed of the mobile terminal may be improved, thereby improving use experience of the mobile terminal. In addition, the application icons or the application screen thumbnails of the background applications in the second background application set are also displayed, thus avoiding displaying the application icons or the application screen thumbnails of the background applications in the second background application set by an instruction input by the user, thereby making the mobile terminal more intelligent, and further improving use experience of the mobile terminal.

Optionally, after the step of displaying a background application classification screen, the method further includes:
  if a fifth input with respect to an application icon or an application screen thumbnail in the background application classification screen is received, displaying the background application screen based on a current background application.

The background application screen is displayed based on the current background application. For example, if the fifth input with respect to an application icon or application screen thumbnail of social software is received, the mobile terminal directly displays a background application screen that includes the application icon or application screen thumbnail of this social software.

The fifth input may be a pinch operation for the application icon or the application screen thumbnail in the background application screen. It should be noted that the pinch operation may be a two-finger pinch, a three-finger pinch, or a four-finger pinch, or the like. Of course, the foregoing two fingers, three fingers, and four fingers may be fingers of a same hand or fingers of different hands. In addition, the fifth input may also be a pressing operation for the application icon or the application screen thumbnail in the background application screen, or the like, and a specific form of the fifth input is not limited herein.

In this embodiment of this disclosure, if the fifth input is received, the background application screen is displayed based on the current background application. In this way, the mobile terminal may switch between the background application screen and the background application classification screen more easily, making the mobile terminal more intelligent.

In the embodiments of this disclosure, through steps 201 to 206, the mobile terminal may perform a corresponding operation on the first background application set based on the received input with respect to the main close button, lock button, or close button respectively, thereby improving the operation effect of the mobile terminal.

Figure 5:
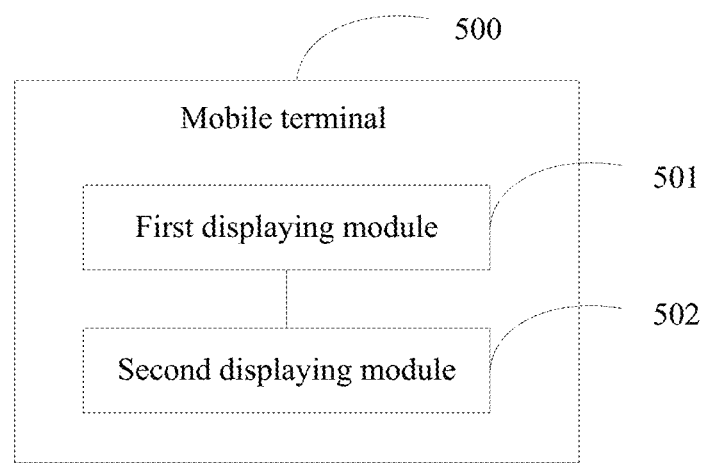
FIG. 5 is a structural diagram of a mobile terminal according to an embodiment of this disclosure.

FIG. 5 is a structural diagram of a mobile terminal according to an embodiment of this disclosure. The mobile terminal can implement details of the method for displaying a background application in the foregoing embodiments and achieve the same effect. As shown in FIG. 5, the mobile terminal 500 includes:

a first displaying module 501, configured to display a background application screen, where the background application screen includes an application icon or an application screen thumbnail of at least one background application; and a second displaying module 502, configured to: if a first input with respect to the application icon or the application screen thumbnail in the background application screen is received, display a background application classification screen, where the background application classification screen includes identification information of at least one background application set, and application icons or application screen thumbnails of background applications in a first background application set.

Figure 6:
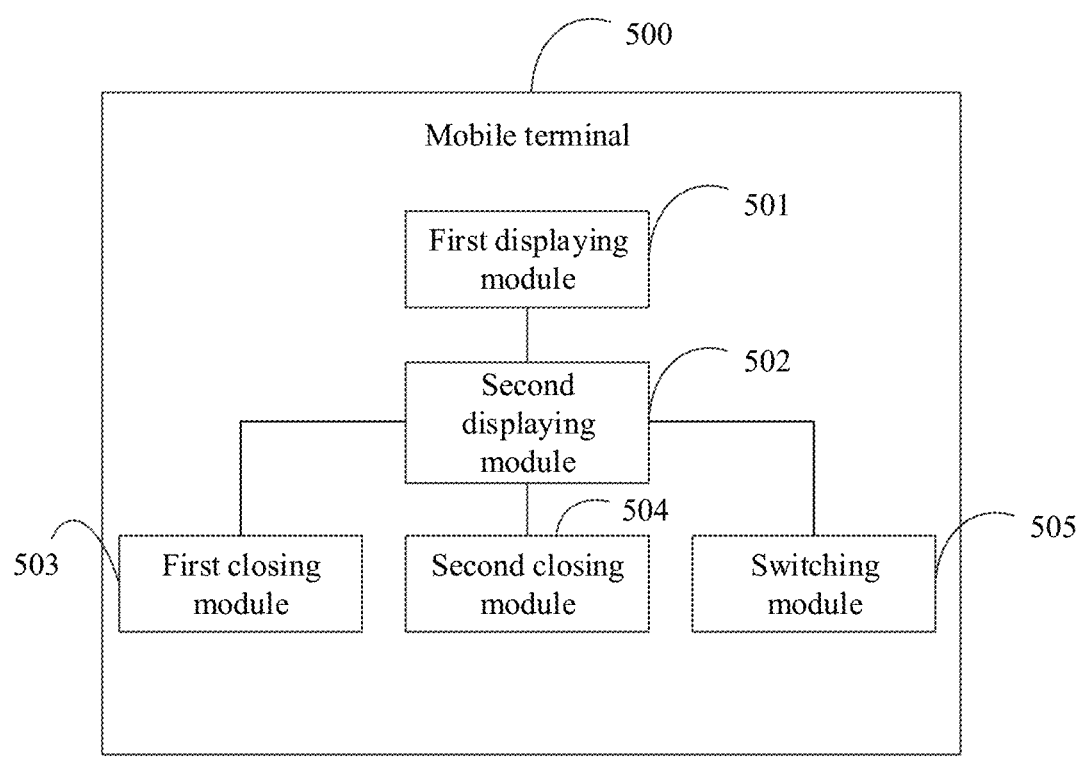
FIG. 6 is a structural diagram of another mobile terminal according to an embodiment of this disclosure.

Optionally, referring to FIG. 6, a main close button is displayed in the background application classification screen, and at least one of a lock button or a close button is displayed on each application icon or each application screen thumbnail in the background application classification screen.

The mobile terminal 500 further includes:

a first closing module 503, configured to: if a second input with respect to a close button displayed on an application icon or an application screen thumbnail is received, close a background application corresponding to the second input; or a second closing module 504, configured to: if a third input with respect to the main close button is received, close an unlocked background application in the first background application set, where the unlocked background application is a background application whose lock button displayed on an application icon or an application screen thumbnail is in an unlocked state; or a switchover module 505, configured to: if a fourth input with respect to a lock button displayed on an application icon or an application screen thumbnail is received, perform state switching on the lock button corresponding to the fourth input, where the state switching includes switching from locked to unlocked, or includes switching from unlocked to locked.

Figure 7:
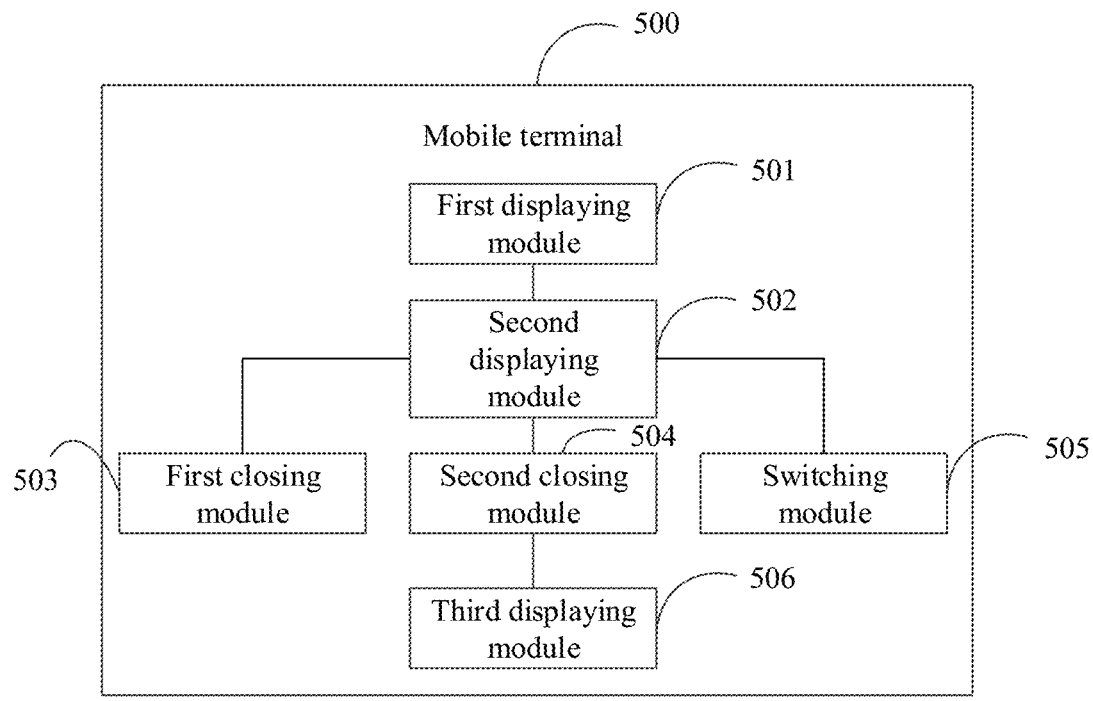
FIG. 7 is a structural diagram of another mobile terminal according to an embodiment of this disclosure.

Optionally, referring to FIG. 7, the mobile terminal 500 further includes:

a third displaying module 506, configured to: if all background applications in the first background application set are closed, delete the first background application set from the background application classification screen, and display application icons or application screen thumbnails of background applications in a second background application set.

Optionally, the at least one background application set includes:

at least one background application set obtained by classifying a first background application based on a user-defined label, where the first background application has the user-defined label; and/or at least one background application set obtained by classifying a second background application based on an application label, where the second background application has the application label, but does not have the user-defined label.

Figure 8:
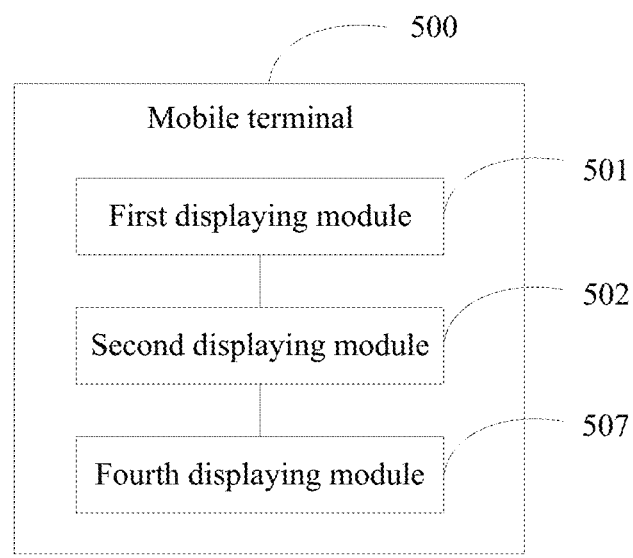
FIG. 8 is a structural diagram of another mobile terminal according to an embodiment of this disclosure.

Optionally, referring to FIG. 8, the mobile terminal 500 further includes:

a fourth displaying module 507, configured to: if a fifth input with respect to an application icon or an application screen thumbnail in the background application classification screen is received, display the background application screen based on a current background application.

The mobile terminal provided in this embodiment of this disclosure is capable of implementing processes that are implemented by the mobile terminal in the method embodiments of FIG. 1 to FIG. 5. To avoid repetition, details are not described herein again. This embodiment of this disclosure can also make an operation on the background application more convenient.

Figure 9:
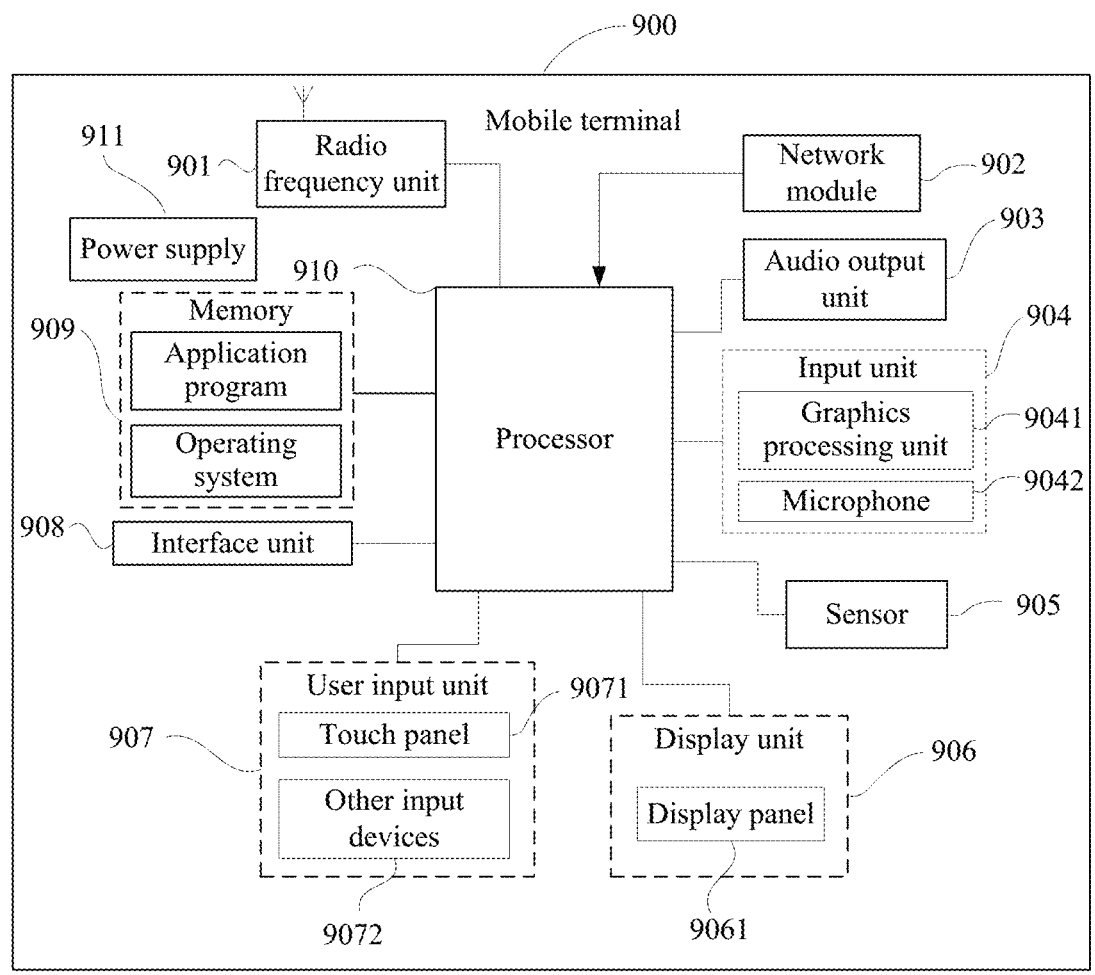
FIG. 9 is a schematic structural diagram of hardware of a mobile terminal according to an embodiment of this disclosure.

FIG. 9 is a schematic structural diagram of hardware of a mobile terminal for implementing the embodiments of this disclosure.

The mobile terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. Persons skilled in the art may understand that the mobile terminal structure shown in FIG. 9 does not constitute a limitation on the mobile terminal. The mobile terminal may include more or fewer components than those shown in the figure, or some components may be combined, or there may be a different component layout. In an embodiment of this disclosure, the mobile terminal includes but is not limited to a mobile phone, a tablet computer, a notebook computer, a palmtop computer, an in-vehicle terminal, a wearable device, a pedometer, and the like.

The processor 910 is configured to:

display a background application screen, where the background application screen includes an application icon or an application screen thumbnail of at least one background application; and if a first input with respect to the application icon or the application screen thumbnail in the background application screen is received, display a background application classification screen, where the background application classification screen includes identification information of at least one background application set, and application icons or application screen thumbnails of background applications in a first background application set.

Optionally, a main close button is displayed in the background application classification screen, and at least one of a lock button or a close button is displayed on each application icon or each application screen thumbnail in the background application classification screen. The processor 910 is further configured to:

if a second input with respect to a close button displayed on an application icon or an application screen thumbnail is received, close a background application corresponding to the second input; or if a third input with respect to the main close button is received, close an unlocked background application in the first background application set, where the unlocked background application is a background application whose lock button displayed on an application icon or an application screen thumbnail is in an unlocked state; or if a fourth input with respect to a lock button displayed on an application icon or an application screen thumbnail is received, perform state switching on the lock button corresponding to the fourth input, where the state switching includes switching from locked to unlocked, or includes switching from unlocked to locked.

Optionally, the processor 910 is further configured to:
if all background applications in the first background application set are closed, delete the first background application set from the background application classification screen, and display application icons or application screen thumbnails of background applications in a second background application set.

Optionally, the at least one background application set includes:

at least one background application set obtained by classifying a first background application based on a user-defined label, where the first background application has the user-defined label; and/or at least one background application set obtained by classifying a second background application based on an application label, where the second background application has the application label, but does not have the user-defined label.

Optionally, the processor 910 is further configured to: if a fifth input with respect to an application icon or an application screen thumbnail in the background application classification screen is received, display the background application screen based on a current background application.

This embodiment of this disclosure can also make an operation on the background application more convenient.

It should be understood that in this embodiment of this disclosure, the radio frequency unit 901 may be configured to: receive and send signals in an information receiving/sending process or a call process; and specifically, after receiving downlink data from a base station, send the downlink data to the processor 910 for processing, and, send uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may further communicate with a network and another device through a wireless communications system.

The mobile terminal provides a user with wireless broadband Internet access through the network module 902, for example, helping the user to send or receive an e-mail, to browse a web page, or to access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the mobile terminal 900. The audio output unit 903 includes a speaker, a buzzer, a telephone receiver, and the like.

The input unit 904 is configured to receive an audio or video signal. The input unit 904 may include a graphics processing unit (GPU) 9041 and a microphone 9042, and the graphics processing unit 9041 processes first image data of a still picture or a video obtained by a first image capture apparatus (for example, a camera) in a video capture mode or a first image capture mode. A processed first image frame may be displayed on the display unit 906. A first image frame processed by the graphics processing unit 9041 may be stored in the memory 909 (or another storage medium) or sent by the radio frequency unit 901 or the network module 902. The microphone 9042 can receive a sound and can process the sound into audio data. The processed audio data can be converted, for outputting, into a format that can be sent to a mobile communication base station through the radio frequency unit 901 in a telephone call mode.

The mobile terminal 900 further includes at least one sensor 905, such as a light sensor, a motion sensor, and other sensors. Specifically, the light sensor includes an ambient light sensor and a proximity sensor, where the ambient light sensor can adjust luminance of the display panel 9061 based on brightness of ambient light, and the proximity sensor can turn off the display panel 9061 and/or backlight when the mobile terminal 900 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided for the user. The display unit 906 may include a display panel 9061, and the display panel 9061 may be configured in the form of a liquid crystal display (LCD), an organic light-emitting diode (OLED), or the like.

The user input unit 907 may be configured to receive input digit or character information and generate key signal input related to user setting and function control of the mobile terminal. Specifically, the user input unit 907 includes a touch panel 9071 and other input devices 9072. The touch panel 9071, also referred to as a touchscreen, may capture a touch operation performed by a user on or near the touch panel (for example, an operation performed by the user on the touch panel 9071 or near the touch panel 9071 by using any appropriate object or accessory such as a finger or a stylus). The touch panel 9071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 910, and receives and executes a command sent by the processor 910. In addition, the touch panel 9071 may be implemented in a plurality of forms, for example, as a resistive, capacitive, infrared, or surface acoustic wave touch panel. The user input unit 907 may further include other input devices 9072 in addition to the touch panel 9071. Specifically, the other input devices 9072 may include but are not limited to a physical keyboard, a function key (such as a volume control key or a power on/off key), a trackball, a mouse, a joystick, and the like. Details are not described herein.

Further, the touch panel 9071 may cover the display panel 9061. After detecting a touch operation on or near the touch panel 9071, the touch panel 9071 transmits the touch operation to the processor 910 to determine a type of a touch event. Then the processor 910 provides corresponding visual output on the display panel 9061 based on the type of the touch event. Although the touch panel 9071 and the display panel 9061 serve as two independent parts to implement input and output functions of the mobile terminal in FIG. 9, in some embodiments, the touch panel 9071 and the display panel 9061 may be integrated to implement the input and output functions of the mobile terminal. This is not specifically limited herein.

The interface unit 908 is an interface connecting an external apparatus to the mobile terminal 900. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 908 may be configured to: receive input (for example, data information and power) from the external apparatus, and transmit the received input to one or more elements in the mobile terminal 900, or may be configured to transmit data between the mobile terminal 900 and the external apparatus.

The memory 909 may be configured to store a software program and various data. The memory 909 may mainly include a program storage area and a data storage area. The program storage area may store an operating system, an application program required for at least one function (such as a sound play function and a first image play function), and the like. The data storage area may store data (such as audio data and a phone book) created based on use of a mobile phone, and the like. In addition, the memory 909 may include a high-speed random access memory, or may include a non-volatile memory, for example, at least one magnetic disk storage device, a flash memory device, or other volatile solid-state storage devices.

The processor 910 is a control center of the mobile terminal. The processor 910 uses various interfaces and lines to connect all parts of the entire mobile terminal, and executes various functions and data processing of the mobile terminal by running or executing the software program and/or module stored in the memory 909 and invoking data stored in the memory 909, thereby performing overall monitoring on the mobile terminal. The processor 910 may include one or more processing units. Optionally, the processor 910 may integrate an application processor and a modem processor. The application processor mainly processes an operating system, a user interface, an application program, and the like. The modem processor mainly processes wireless communication. It may be understood that the modem processor may alternatively not be integrated into the processor 910.

The mobile terminal 900 may further include the power supply 911 (for example, a battery) supplying power to all components. Preferably, the power supply 911 may be logically connected to the processor 910 through a power management system. In this way, functions such as charge management, discharge management, and power consumption management are implemented by using the power management system.

In addition, the mobile terminal 900 includes some functional modules that are not shown, details of which are not described herein.

Optionally, the embodiments of this disclosure further provide a mobile terminal, including: a processor 910, a memory 909, and a computer program that is stored in the memory 909 and capable of running on the processor 910. When the computer program is executed by the processor 910, processes in the foregoing embodiments of a method for displaying a background application are implemented, with the same technical effects achieved. To avoid repetition, details are not described herein again.

The embodiments of this disclosure further provide a computer-readable storage medium, where the computer-readable storage medium stores a computer program. When the computer program is executed by a processor, the processes of the foregoing embodiments of a method for displaying a background application are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for displaying a background application, performed by a mobile terminal, wherein the method comprises:

controlling, by a processor of the mobile terminal, a display of the mobile terminal to display a background application screen, wherein the background application screen comprises an application icon or an application screen thumbnail of at least one background application; and in response to receiving, in the background application screen, a first input with respect to the application icon or the application screen thumbnail, controlling, by the processor of the mobile terminal, the display of the mobile terminal to display a background application classification screen, wherein the background application classification screen comprises identification information of at least one background application set, and application icons or application screen thumbnails of background applications in a first category, wherein the identification information of the at least one background application set indicates at least one background application category, and the first category is a background application category corresponding to a first background application set of the at least one background application set, wherein the at least one background application set is obtained by classifying the at least one background application, wherein a main close button is displayed in the background application classification screen, and at least one of a lock button or a close button is displayed on each application icon or each application screen thumbnail in the background application classification screen; and after the step of displaying a background application classification screen, the method further comprises:

in response to receiving a third input with respect to the main close button, closing an unlocked background application in the first background application set, wherein the unlocked background application is a background application whose lock button displayed on an application icon or an application screen thumbnail is in an unlocked state; or in response to receiving a fourth input with respect to a lock button displayed on an application icon or an application screen thumbnail, performing state switching on the lock button corresponding to the fourth input, wherein the state switching comprises switching from locked to unlocked, or comprises switching from unlocked to locked.

2. The method according to claim 1, wherein after the step of displaying a background application classification screen, the method further comprises:

deleting the first background application set from the background application classification screen and displaying application icons or application screen thumbnails of background applications in a second background application set, in response to determining that all background applications in the first background application set are closed.

3. The method according to claim 2, wherein after the step of displaying a background application classification screen, the method further comprises:

in response to receiving a fifth input with respect to an application icon or an application screen thumbnail in the background application classification screen, displaying the background application screen based on a current background application.

4. The method according to claim 1, wherein the at least one background application set comprises:

at least one background application set obtained by classifying a first background application based on a user-defined label, wherein the first background application has the user-defined label; and/or at least one background application set obtained by classifying a second background application based on an application label, wherein the second background application has the application label, but does not have the user-defined label.

5. The method according to claim 4, wherein after the step of displaying a background application classification screen, the method further comprises:

in response to receiving a fifth input with respect to an application icon or an application screen thumbnail in the background application classification screen, displaying the background application screen based on a current background application.

6. The method according to claim 1, wherein after the step of displaying a background application classification screen, the method further comprises:

in response to receiving a fifth input with respect to an application icon or an application screen thumbnail in the background application classification screen, displaying the background application screen based on a current background application.

7. A mobile terminal, comprising: a memory, a processor, and a program that is stored in the memory and is capable of running on the processor, wherein when the program is executed by the processor, steps of a method for displaying a background application are implemented, wherein the method comprises:

controlling, by the processor of the mobile terminal, a display of the mobile terminal to display a background application screen, wherein the background application screen comprises an application icon or an application screen thumbnail of at least one background application; and in response to receiving, in the background application screen, a first input with respect to the application icon or the application screen thumbnail, controlling, by the processor of the mobile terminal, the display of the mobile terminal to display a background application classification screen, wherein the background application classification screen comprises identification information of at least one background application set, and application icons or application screen thumbnails of background applications in a first category, wherein the identification information of the at least one background application set indicates at least one background application category, and the first category is a background application category corresponding to a first background application set of the at least one background application set, wherein the at least one background application set is obtained by classifying the at least one background application, wherein a main close button is displayed in the background application classification screen, and at least one of a lock button or a close button is displayed on each application icon or each application screen thumbnail in the background application classification screen; and after the step of displaying a background application classification screen, the method further comprises:

in response to receiving a third input with respect to the main close button, closing an unlocked background application in the first background application set, wherein the unlocked background application is a background application whose lock button displayed on an application icon or an application screen thumbnail is in an unlocked state; or in response to receiving a fourth input with respect to a lock button displayed on an application icon or an application screen thumbnail, performing state switching on the lock button corresponding to the fourth input, wherein the state switching comprises switching from locked to unlocked, or comprises switching from unlocked to locked.

8. The mobile terminal according to claim 7, wherein after the step of displaying a background application classification screen, the method further comprises:

deleting the first background application set from the background application classification screen and displaying application icons or application screen thumbnails of background applications in a second background application set, in response to determining that all background applications in the first background application set are closed.

9. The mobile terminal according to claim 8, wherein after the step of displaying a background application classification screen, the method further comprises:
- in response to receiving a fifth input with respect to an application icon or an application screen thumbnail in the background application classification screen, displaying the background application screen based on a current background application.

10. The mobile terminal according to claim 7, wherein the at least one background application set comprises:
- at least one background application set obtained by classifying a first background application based on a user-defined label, wherein the first background application has the user-defined label; and/or
- at least one background application set obtained by classifying a second background application based on an application label, wherein the second background application has the application label, but does not have the user-defined label.

11. The mobile terminal according to claim 10, wherein after the step of displaying a background application classification screen, the method further comprises:
- in response to receiving a fifth input with respect to an application icon or an application screen thumbnail in the background application classification screen, displaying the background application screen based on a current background application.

12. The mobile terminal according to claim 7, wherein after the step of displaying a background application classification screen, the method further comprises:
- in response to receiving a fifth input with respect to an application icon or an application screen thumbnail in the background application classification screen, displaying the background application screen based on a current background application.

\* \* \* \* \*